June 2, 1970  J. F. KEPHART  3,514,953
TRIMODE ROCKET ENGINE
Filed Oct. 21, 1968
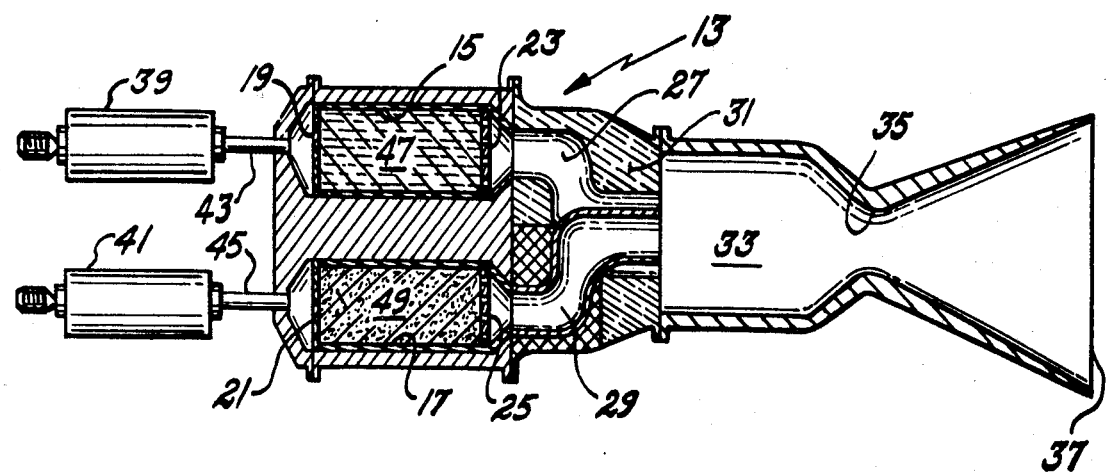
INVENTOR.
JIMMY F. KEPHART
BY Harry A. Herbert Jr.
and Arsen Tashjian
ATTORNEYS 3,514,953

TRIMODE ROCKET ENGINE

Jimmy F. Kephart, Edwards AFB, Calif., assignor to the United States of America as represented by the Secretary of the Air Force Filed Oct. 21, 1968, Ser. No. 769,353
Int. Cl. F02k 9/02
U.S. Cl. 60—258 5 Claims

ABSTRACT OF THE DISCLOSURE

A trimode rocket engine having two separate catalyst beds for decomposing two propellants after which they are injected and mixed in a single combustion chamber for providing thrust in varying amounts. Means are provided for injecting either propellant singly to allow the engine to operate as a monopropellant type in the medium or low thrust ranges depending on which of the two propellants is used or the engine can operate in the bipropellant mode (both propellants simultaneously) to provide high thrust.

BACKGROUND OF THE INVENTION

This invention relates to rocket engine capable of operation at three different thrust levels and, more particularly, the invention is concerned with providing a rocket engine which can operate in three modes: as a single propellant—low thrust, single propellant—medium thrust and bipropellant—high thrust.

Spacecraft, both manned and unmanned, are currently required to carry duplicate attitude control systems to prevent mission failure due to loss of attitude control ability. This requirement results in a severe weight penalty and is necessary because of the high system guarantee of reliability that is required. It would be most desirable to provide an engine which would be capable of operation in any one of a series of modes without providing corresponding duplicate propulsion systems for each of the modes. This arrangement would provide the redundancy necessary for the required reliability without the added weight and inefficiency.

SUMMARY OF THE INVENTION

The present invention provides a rocket propulsion system wherein a bipropellant rocket engine can, by design, be operated in either of two monopropellant modes as well. The bipropellant mode uses decomposition products in gaseous form for combustion. The one engine operates as three engines and as such is inherently redundant and more reliable than other engines.

The trimode engine herein disclosed is relatively simple and can be constructed in the manner presently known and used in constructing monopropellant and bipropellant engines. In general, any two propellants which can be spontaneously decomposed by catalytic action and which, together, react hypergolically can be used in the basic trimode concept.

Accordingly, it is an object of the invention to provide a rocket engine which is capable of operation in any one of a series of predetermined modes of operation.

Another object of the present invention is to provide a multimode rocket engine suitable for attitude control wherein the thrust level is controllable by choosing an operating mode having a thrust output compatible with the control requirement.

Still another object of the invention is to provide a rocket engine which can be step-throttled without complex mechanical devices by merely selecting the desired operating mode from among several possible operating conditions.

A further object of the invention is to provide a rocket engine capable of operation as a bipropellant high thrust engine, as a monopropellant medium thrust engine and as a monopropellant low thrust engine.

Another further object of the invention is to provide a multimode rocket engine for use in attitude control and which is inherently redundant without the necessity of duplicate propulsion systems.

Another still further object of the invention is to provide a rocket engine which is capable of continued operation after failure of one fuel system in the bipropellant mode. The engine is then capable of operation as a monopropellant engine thereby adding to the chance of success of the space mission.

These and other objects, features and advantages will become more apparent after considering the description that follows taken in conjunction with the attached drawing and appended claims.

DESCRIPTION OF THE DRAWING

The figure is a schematic view in longitudinal section of a preferred embodiment of the trimode rocket engine concept showing one of the multiple annular elements employed in the injection technique.

DESCRIPTION OF A PREFERRED EMBODIMENT

Referring now to the drawing, the trimode rocket engine 13 includes a pair of reaction chambers 15 and 17 which are cylindrical in shape and formed of some heat resistant material. The forward or inlet end of each of the reaction chambers 15 and 17 is provided with screens 19 and 21, respectively, which operate to retain spontaneous catalysts therein. Corresponding perforated plates 23 and 25 are positioned in the rearward or outlet end of the chambers 15 and 17 to prevent escape of catalyst material therefrom.

The outlets of the reaction chambers 15 and 17 are connected to corresponding gaseous injections 27 and 29. The injectors 27 and 29 have low internal volume for fast response and hot gaseous mixing as well as low thermal conductivity to avoid heat loss. In addition, the injectors are surrounded with insulating material 31 to prevent cooling of the hot gaseous mixture.

The outlet of the gaseous injectors 27 and 29 is fed into the thrust chamber 33 having a throat section 35 and expansion nozzle 37. Depending on the mode of operation, the hot gaseous mixture may come from injector 27 alone, injector 29 alone or both injectors 27 and 29 simultaneously. The heated products are expanded and accelerated during passage through the chamber 33 and thrust nozzle 37 and provide thrust required to propel the rocket for attitude control.

The reaction chambers 15 and 17 form catalyst beds when filled with a catalytic material. For example, the chamber 15 may be filled with Shell 405 type spontaneous catalyst when used with hydrazine propellant. Likewise, chamber 17 may be filled with nickel-silver screen type spontaneous catalyst when used with hydrogen peroxide propellant. In the embodiment shown, the fuels are independently controlled by the valves 39 and 41 which are provided with thermal standoffs 43 and 45 to avoid heat load to the respective valves. In the foregoing example, the valve 39 controls the rate of flow of hydrazine while the valve 41 controls the flow of hydrogen peroxide.

The injection technique employed includes a multiple of annular elements although the drawing shows only one of such elements. Basically, a preferred embodiment of the engine comprises two catalyst beds, a hydrazine bed 47 made up of Shell 405 type catalyst or some other suitable hydrazine spontaneous catalyst and a hydrogen peroxide catalyst bed 49 which is well known and routinely produced by many aerospace companies. The injector system 27 and 29 can be any type which provides good mixing of hot decomposition products, although the annular type is shown. The combustion chamber 33 is of standard rocket engine design and requires only materials compatible with the combustion temperature and products. Independent valving 39 and 41, as shown, is required to prevent compromise of the multimode operation of the engine 13 by allowing a free choice of fuel input sequence.

Although reference is made to hydrazine and peroxide specifically as propellants, it should be noted that the hereinbefore disclosed rocket engine is not limited to this combination. Advances in catalyst materials will permit the use of various other fuels and blends in carrying out the operation of the invention. In general, any two propellants which can be spontaneously decomposed by catalytic action and which, together, react hypergolically can be used in the basic trimode or multimode concept.

Although the invention has been illustrated in the accompanying drawing and described in the foregoing specification in terms of a preferred embodiment thereof, the invention is not limited to this embodiment or to the particular configurations mentioned. It will be apparent to those skilled in the art that my invention can be used in multimode operation by providing three or more different propellants which can be injected in various combinations to provide corresponding variations of thrust levels. Also, it should be understood that various changes, alterations, modifications and substitutions, particularly with respect to the construction details, can be made in the arrangement of the several elements without departing from the true spirit and scope of the appended claims.

Having thus described my invention, what I claim as new and desire to secure by Letters Patent of the United States is:

1. A multimode rocket engine for providing varying thrust levels from a single engine comprising at least two separate liquid propellant sources, means for independently controlling the supply of each of said propellants, a corresponding number of reaction chambers having inlets communicating with each of said propellant control means, each of said reaction chambers including a catalyst bed for spontaneously decomposing the liquid propellant, injecting means connected to the outlets of said reaction chambers for receiving the decomposed liquid propellants, and a combustion chamber having a throat section and a nozzle downstream therefrom, the decomposed liquid propellants being mixed in said combustion chamber to provide the required level of thrust.

2. The multimode rocket engine defined in claim 1 wherein the liquid propellants flowing through said supply control means are spontaneously decomposable by catalytic action and react hypergolically when mixed together in the combustion chamber.

3. The multimode rocket engine defined in claim 2 wherein the liquid propellants are hydrazine and hydrogen peroxide.

4. The multimode rocket engine defined in claim 2 wherein the injecting means for receiving the decomposed propellants are of the annular type.

5. The multimode rocket engine defined in claim 3 wherein three thrust levels of operation are available in three corresponding modes of operation including high thrust in the bipropellant mode using both hydrazine and hydrogen peroxide simultaneously, medium thrust in a monopropellant mode using hydrazine alone and low thrust in a monopropellant mode using hydrogen peroxide alone.

References Cited

UNITED STATES PATENTS

| 2,706,887 | 4/1955 | Grow | 60—258 |
| 2,769,304 | 11/1956 | Burton | 60—39.46 |
| 3,447,316 | 6/1969 | White | 60—258 |

FOREIGN PATENTS 793,689  4/1958  Great Britain.

MARK M. NEWMAN, Primary Examiner

D. HART, Assistant Examiner

U.S. Cl. X.R.

60—39.46, 244